United States Patent Office 3,449,109
Patented June 10, 1969

3,449,109
PHOSPHORYLATED ACETAMIDES AS HERBICIDES
Sidney B. Richter, Chicago, Ill., assignor to Velsicol Chemical Corporation, Chicago, Ill., a corporation of Illinois
No Drawing. Filed Feb. 1, 1965, Ser. No. 429,641
The portion of the term of the patent subsequent to Oct. 31, 1984, has been disclaimed
Int. Cl. A01m 9/36; C07f 9/40
U.S. Cl. 71—87      9 Claims

ABSTRACT OF THE DISCLOSURE

A process for controlling undesirable plant life which comprises applying to said plant life, in a quantity which is herbicidally toxic, a compound of the formula

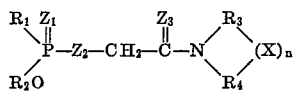

wherein $Z_1$, $Z_2$ and $Z_3$ are independently selected from the group consisting of sulfur and oxygen; $R_1$ is aryl; $R_2$ is selected from the group consisting of alkyl, aralkyl and aryl; $R_3$ and $R_4$ are independently selected from the group consisting of alkyl, acyl, aryl, aralkyl, hydroxyalkyl, alkenyl, cycloalkyl, and hydrogen provided that a maximum of one of $R_3$ and $R_4$ is hydrogen, and alkylene; $n$ is an integer from 0 to 1; and X is selected from the group consisting of oxygen, sulfur, $>NY$ and $>CHY$ wherein Y is selected from the group consisting of lower alkyl and hydrogen, provided that when $n$ is 0, $R_3$ and $R_4$ are selected from the group consisting of alkyl, acyl, aryl, aralkyl, hydroxyalkyl, alkenyl, cycloalkyl, and hydrogen provided that a maximum of one of $R_3$ and $R_4$ is hydrogen and when $n$ is 1, $R_3$ and $R_4$ is alkylene.

---

This invention relates to the control of undesirable plant life. More particularly, this invention relates to the control of undesirable plant life with the use of chemical compounds of the general formula

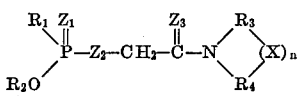

wherein $Z_1$, $Z_2$, and $Z_3$ are independently selected from the group consisting of sulfur and oxygen; $R_1$ is aryl; $R_2$ is selected from the group consisting of alkyl, aralkyl and aryl; $R_3$ and $R_4$ are independently selected from the group consisting of alkyl, alkylene, acyl, aryl, aralkyl, hydroxyalkyl, alkenyl, cycloalkyl, and hydrogen provided that a maximum of one of $R_3$ and $R_4$ is hydrogen; $n$ is an integer from 0 to 1; and X is selected from the group consisting of oxygen, sulfur, $>NY$ and $>CHY$ wherein Y is selected from the group consisting of lower alkyl and hydrogen, provided that when $n$ is 0, $R_3$ and $R_4$ are selected from the group consisting of alkyl, acyl, aryl, aralkyl, hydroxyalkyl, alkenyl, cycloalkyl, and hydrogen provided that a maximum of one of $R_3$ and $R_4$ is hydrogen and when $n$ is 1, $R_3$ and $R_4$ are alkylene. In a preferred embodiment of this invention $R_1$ is selected from the group consisting of unsubstituted aryl containing 6 to 10 carbon atoms and substituted aryl wherein the substituents are selected from the group consisting of alkyl containing 1 to 10 carbon atoms, halogen and mixtures thereof; $R_2$ is selected from the group consisting of alkyl containing 1 to 10 carbon atoms, aralkyl containing 7 to 20 carbon atoms, and aryl containing 6 to 20 carbon atoms; $R_3$ and $R_4$ are independently selected from the group consisting of alkyl, acyl and alkylene containing 1 to 10 carbon atoms; $n$ is an integer from 0 to 1; and X is selected from the group consisting of oxygen, sulfur, and $>NY$ wherein Y is selected from the group consisting of alkyl containing 1 to 4 carbon atoms and hydrogen, provided that when $n$ is 0, $R_3$ and $R_4$ are selected from the group consisting of alkyl and acyl containing from 1 to 10 carbon atoms and when $n$ is 1, $R_3$ and $R_4$ are alkylene containing from 1 to 10 carbon atoms.

Unexpectedly, it has been found that the method of the present invention is effective in controlling undesirable plant life. Exemplary of the compounds which have been found useful in this method are:

O-methyl S-(N-methyl-N-isopropylcarbamylmethyl) phenylphosphonothiolothionate,
O-ethyl S-(N-methyl-N-isopropylcarbamylmethyl) phenylphosphonothiolothionate,
O-methyl S-(N,N-dimethylcarbamylmethyl) phenylphosphonothiolothionate,
O-n-propyl S-(N-methyl-N-isopropylcarbamylmethyl) phenylphosphonothiolothionate,
O-isopropyl S-(N-methyl-N-isopropylcarbamylmethyl) phenylphosphonothiolothionate,
O-ethyl S-(N,N-dimethylcarbamylmethyl) phenylphosphonothiolothionate,
O-n-hexyl S-(N-methyl-N-isopropylcarbamylmethyl) phenylphosphonothiolothionate,
O-cyclohexyl S-(N-methyl-N-isopropylcarbamylmethyl) phenylphosphonothiolothionate,
O-n-butyl S-(N-methyl-N-isopropylcarbamylmethyl) phenylphosphonothiolothionate,
O-sec-butyl S-(N,N-dimethylcarbamylmethyl) phenylphosphonothiolothionate,
O-tert-butyl S-(N-methyl-N-ethylcarbamylmethyl) phenylphosphonothiolothionate,
O-ethyl S-(N-methyl-N-isopropylcarbamylmethyl) 4-chlorophenylphosphonothiolothionate,
O-ethyl S-(N-methyl-N-isopropylcarbamylmethyl) 2,4-dichlorophenylphosphonothiolothionate,
O-ethyl S-(N-methyl-N-isopropylcarbamylmethyl) 2,4-dimethylphenylphosphonothiolothionate,
O-ethyl S-(N-methyl-N-isopropylcarbamylmethyl) 2-methyl-4-chlorophenylphosphonothiolothionate,
O-methyl S-(N-methyl-N-isopropylcarbamylmethyl) 2,4,5-trichlorophenylphosphonothiolothionate,
O-ethyl S-(N,N-diethylcarbamylmethyl) phenylphosphonothiolothionate,
O-ethyl O-(N-methyl-N-isopropylcarbamylmethyl) phenylphosphonate,
O-ethyl O-(N-methyl-N-isopropylcarbamylmethyl) phenylphosphonothionate,
O-ethyl S-(N-methyl-N-isopropylcarbamylmethyl) phenylphosphonothiolate,
O-phenyl S-(N,N-dimethylcarbamylmethyl) phenylphosphonothiolothionate,
O-benzyl S-(N-methyl-N-isopropylcarbamylmethyl) phenylphosphonothiolothionate,
O-methyl S-(N-acetylcarbamylmethyl) phenylphosphonothiolothionate,
O-methyl S-(N-acetyl-N-ethylcarbamylmethyl) phenylphosphonothiolothionate,
O-ethyl S-(N-phenyl-N-ethylcarbamylmethyl) phenylphosphonothiolothionate,
O-ethyl S-(N-benzyl-N-methylcarbamylmethyl) phenylphosphonothiolothionate,
O-isopropyl S-(N-methyl-N-phenylcarbamylmethyl) 2-methyl-4-chlorophenylphosphonothiolothionate,
O-ethyl S-(N,N-diallylcarbamylmethyl) phenylphosphonothiolothionate,
O-ethyl S-(N-hydroxyethyl-N-isopropylcarbamylmethyl) phenylphosphonothiolothionate, O-methyl S-(morpholinocarbonylmethyl) phenylphos-
phonothiolothionate,
O-ethyl S-(thiomorpholinocarbonylmethyl) phosphono-
thiolothionate,
O-methyl S-(piperidinocarbonylmethyl) phenylphos-
phonothiolothionate,
O-ethyl S-(piperazinocarbonylmethyl) phenylphos-
phonothiolothionate,
O-n-propyl S-(4-methylpiperazinocarbonylmethyl)
phenylphosphonothiolothionate,
O-methyl S-(imidazolidinylcarbonylmethyl) phenyl-
phosphonothiolothionate,
O-isopropyl S-(morpholinocarbonylmethyl) phenylphos-
phonothiolothionate,
O-ethyl S-(morpholinocarbonylmethyl) 2,4-dichloro-
phenylphosphonothiolothionate,
and the like.

These compounds can readily be prepared by reacting
a compound of the formula

in which $R_1$, $R_2$, $Z_1$ and $Z_2$ are as described above and
Me represents a cation such as ammonium or an alkali
metal ion, with a compound of the formula

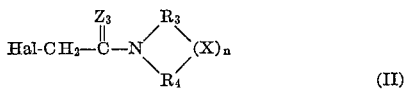

in which $R_3$, $R_4$ $Z_3$ $n$ and X are as described above and
Hal represents a halogen atom such as chlorine or bro-
mine. The reaction is conveniently carried out in a suit-
able solvent, such as water, aromatics, saturated lower
alkanes, alcohols, ketones, esters, and the like, at room
temperature or higher.

Exemplary of compounds of Formula I suitable for use
in the preparation of the compounds of the present inven-
tion are:

sodium O-methyl phenylphosphonothiolothionate,
ammonium O-methyl phenylphosphonothiolothionate,
sodium O-methyl phenylphosphonothionate,
potassium O-methyl phenylphosphonothiolothionate,
sodium O-ethyl phenylphosphonothiolothionate,
sodium O-ethyl phenylphosphonate,
sodium O-n-propyl phenylphosphorothiolothionate,
sodium O-isopropyl phenylphosphorothiolothionate,
sodium O-ethyl 4-chlorophenylphosphonothiolothionate,
sodium O-cyclohexyl 2-methyl-4-chlorophenylphosphono-
thiolothionate,
O-phenyl phenylphosphonothiolothionate,
O-phenyl benzylphosphonothiolothionate, and the like.

Among the suitable compounds of the Formula II
which can be utilized as described above in the prepara-
tion of the compounds of the present invention are:

N-methyl-2-chloroacetamide,
N-methyl-2-bromoacetamide,
N,N-dimethyl-2-chloroacetamide,
N-ethyl-2-chloroacetamide,
N,N-diethyl-2-chloroacetamide,
N-methyl-N-n-propyl-2-chloroacetamide,
N-isopropyl-2-chloroacetamide,
N-methyl-N-isopropyl-2-chloroacetamide,
N,N-diisopropyl-2-chloroacetamide,
N-ethyl-N-isopropyl-2-chloroacetamide,
N-butyl-2-chloroacetamide,
N-pentyl-N-methyl-2-chloroacetamide,
N-nonyl-N-methyl-2-chloroacetamide,
N-decyl-N-ethyl-2-chloroacetamide,
N-acetyl-2-chloroacetamide,
N-acetyl-N-methyl-2-chloroacetamide,
N-methyl-N-phenyl-2-chloroacetamide,
N-phenyl-2-chloroacetamide,
N,N-diphenyl-2-chloroacetamide,
N-benzyl-N-methyl-2-chloroacetamide,
N-ethyl-N-phenyl-2-chloroacetamide,
N-(2-methyl-4-chlorophenyl)-2-chloroacetamide,
N-methyl-N-(2-methyl-4-chlorophenyl)-2-chloroaceta-
mide,
N-methyl-N-(2,4-dichlorophenyl)-2-chloroacetamide,
N-allyl-2-chloroacetamide,
N,N-diallyl-2-chloroacetamide,
N-hydroxyethyl-2-chloroacetamide,
N-hydroxyethyl-N-isopropyl-2-chloroacetamide,
4-chloroacetylmorpholine,
4-chloroacetylthiomorpholine,
4-bromoacetylmorpholine,
4-chlorothioacetylthiomorpholine,
1-chloroacetylpiperidine,
1-bromoacetylpiperadine,
1-chloroacetylpiperazine,
1-chloroacetyl-4-methylpiperazine,
1-chloroacetylpyrrolidine,
1-bromoacetylpyrrolidine,
3-chloroacetyloxazolidine,
3-chloroacetylthiazolidine,
1-chloroacetylhexahydropyrimidine, and the like.

The manner in which the new compounds of the present
invention can be prepared readily is illustrated in the
following examples:

Example 1.—Preparation of O-methyl S-(N-methyl-N-
isopropylcarbamylmethyl) phenylphosphonothiolothio-
nate Sodium O-methyl phenylphosphonothiolothionate (22.6
g.; 0.1 mol) and N-methyl-N-isopropyl-2-chloroacetamide
(15 g.; 0.1 mol) are dissolved in benzene (250 ml.) and
heated at reflux for about 6 hours. The precipitate is
filtered off and the filtrate distilled in vacuo to recover
crude O-methyl S-(N-methyl-N-isopropylcarbamylmeth-
yl) phenylphosphonothiolothionate as the residue. The
crude product can be used as such or can be purified by
distillation and/or crystallization from a suitable solvent.

Example 2.—Preparation of O-isopropyl S-(N-methyl-N-
isopropylcarbamylmethyl) phenylphosphonothiolothio-
nate Sodium O-isopropyl phenylphosphonothiolothionate
(25.4 g.; 0.1 mol) and N-methyl-N-isopropyl-2-chloro-
acetamide (15 g.; 0.1 mol) are dissolved in benzene (250
ml.) and heated at reflux as described in Example 1. The
precipitate is filtered and the filtrate distilled in vacuo to
recover crude O-isopropyl S-(N-methyl-N-isopropylcar-
bamylmethyl) phenylphosphonothiolothionate as the resi-
due. The crude product can be used as such or can be puri-
fied by distillation and/or crystallization from a suitable
solvent.

Example 3.—Preparation of O-methyl S-(morpholinocar-
bonylmethyl) phenylphosphonothiolothionate Sodium O-methyl phenylphosphonothiolothionate (22.6
g.; 0.1 mol) and 4-chloroacetylmorpholine (16.3 g.; 0.1
mol) are dissolved in benzene (250 ml.) and heated at
reflux for about 5 hours. The precipitate is filtered off and
the filtrate distilled in vacuo to recover crude O-methyl
S - (morpholinocarbonylmethyl) phenylphosphonothiolo-
thionate as the residue. The crude product can be used as
such or can be purified by distillation and/or crystalliza-
tion from a suitable solvent.

Other compounds within the scope of the present inven-
tion can be prepared readily in the manner heretofore de-
scribed. Presented in the following examples are the es-
sential reactants required to prepare the indicated named
compounds according to the procedure detailed in the fore-
going examples.

Example 4

Sodium O-ethyl phenylphosphonothiolothionate+N-methyl-N-isopropyl-2-chloroacetamide=O-ethyl S-(N-methyl-N-isopropylcarbamylmethyl) phenylphosphonothiolothionate.

Example 5

Ammonium O-methyl phenylphosphonothiolothionate +N,N-dimethyl-2-chloroacetamide=O-methyl S-(N,N-dimethylcarbamylmethyl) phenylphosphonothiolothionate.

Example 6

Ammonium O-n-propyl phenylphosphonothiolothionate +N-methyl-N-phenyl-2-chloroacetamide=O-n-propyl S-(N-methyl-N-phenylcarbamylmethyl) phenylphosphonothiolothionate.

Example 7

Sodium O-cyclohexyl phenylphosphonothiolothionate +N-methyl-N-isopropyl-2-chloroacetamide=O-cyclohexyl S-(N-methyl-N-isopropylcarbamylmethyl) phenylphosphonothiolothionate.

Example 8

Sodium O-methyl 4-chloro phenylphosphonothiolothionate+N-ethyl-N-isopropyl-2-chloroacetamide=O-methyl S-(N-ethyl-N-isopropylcarbamylmethyl) 4-chlorophenylphosphonothiolothionate.

Example 9

Sodium O-ethyl 2,4-dichlorophenylphosphonothiolothionate+N-methyl-N-isopropyl-2-chloroacetamide=O-ethyl S-(N-methyl-N-isopropylcarbamylmethyl) 2,4-dichlorophenylphosphonothiolothionate.

Example 10

Sodium O-ethyl 2-methyl-4-chlorophenylphosphonothiolothionate+N-methyl-N-isopropyl-2-chloroacetamide =O-ethyl S-(N-methyl-N-isopropylcarbamylmethyl) 2-methyl-4-chlorophenylphosphonothiolothionate.

Example 11

Sodium O-ethyl phenylphosphonothiothionate+N,N-diethyl-2-chloroacetamide=O-ethyl S-(N,N-diethylcarbamylmethyl) phenylphosphonothiolothionate.

Example 12

Sodium O-ethyl phenylphosphonothiolothionate+N,N-diallyl-2-chloroacetamide=O-ethyl S-(N,N-diallylcarbamylmethyl) phenylphosphonothiolothionate.

Example 13

Potassium O-methyl phenylphosphonothiolothionate +1-bromoacetylpiperidine=O-methyl S-(piperidinocarbonylmethyl) phenylphosphonothiolothionate.

Example 14

Sodium O-isopropyl phenylphosphonothiolothionate+4-chloroacetylmorpholine=O-isopropyl S-(morpholinocarbonylmethyl) phenylphosphonothiolothionate.

Example 15

Sodium O-methyl phenylphosphonothiolothionate+N-methyl-N-4-chlorophenyl-2-chloroacetamide=O-methyl S-(N-methyl-N-4-chlorophenylcarbamylmethyl) phenylphosphonothiolothionate.

Example 16

Sodium O-ethyl phenylphosphonothiolothionate+N-methyl-N-2,4-dichlorophenyl-2-chloroacetamide=O-ethyl S-(N-methyl-N-2,4-dichlorophenylcarbamylmethyl) phenylphosphonothiolothionate.

For practical use of the method of this invention, the compounds heretofore described are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatomspheric pressure as aerosols. However, preferred liquid herbicidal compositions are emulsifiable concentrates, which comprise an active compound and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water-in-oil) can be prepared for direct application to weed infestations.

A typical herbicidal composition useful in the method of this invention is illustrated by the following example, in which the quantities are in parts by weight.

Example 17.—Preparation of a dust

| | |
|---|---|
| Product of Example 1 | 10 |
| Powdered talc | 90 |

The above ingredients are mixed in a mechanical grinder-blender and are ground until a homogeneous, free-flowing dust of the desired particle size is obtained. This dust is suitable for direct application to the site of the weed infestation.

The method of this invention includes the application of the heretofore described herbicidal compositions in any manner recognized by the art. One method for the control of weeds comprises contacting the locus of said weeds with a herbicidal composition comprising an inert carrier and as an essential active ingredient, in a quantity which is herbicidally toxic to said weeds, one of the compounds heretofore described. The concentration of these compounds in the herbicidal compositions will vary greatly with the type of formulation and the purpose for which it is designed, but generally the herbicidal compositions will comprise from about 0.05 to about 95 percent by weight of the active compounds. In a preferred embodiment of this invention, the herbicidal compositions will comprise from about 5 to about 75 percent by weight of the active compound. The compositions can also comprise such addition substances as other pesticides, such as insecticides, nematocides, fungicides, and the like; stabilizers; spreaders; deactivators; adhesives; stickers; fertilizers; activators; synergists; and the like.

The compounds heretofore described are also useful in the method of the present invention when combined with other herbicides and/or defoliants, desiccants, growth inhibitors and the like, in the herbicidal compositions heretofore described. These other materials can comprise from about 5% to about 95% of the active ingredients in the herbicidal compositions. Use of combinations of these other herbicides and/or defoliants, desiccants, etc. with the compounds heretofore described provide herbicidal compositions which are more effective in the method of the present invention in controlling weeds and often provide results unattainable with separate compositions of the individual herbicides. The other herbicides, defoliants, desiccants and plant growth inhibitors with which these compounds can be used in the herbicidal compositions to control weeds, can include chlorophenoxy herbicides such as 2,4-D, 2,4,5-T, MCPA, MCPB, 4(2,4-DB), and the like; cabamate herbicides such as IPC, CIPC, swep, barban, and the like; thiocarbamate and dithiocarbamate herbicides such as CDEC, metham sodium, EPTC, dialate, PEBC, and the like; substituted urea herbicides such as dichloral urea, fenuron, monuron, diuron, linuron, neburon, and the like; symmetrical triazine herbicides such as simazine, chlorazine, atrazine, trietazine, simetone, prometone, propazine, ametryne, and the like; chloroacetamide herbicides such as alpha-chloro-N,N-dimethyl-acetamide, CDEA, alpha - chloro - N - isopropylacetamide, 4 - (chloroacetyl)morpholine, 1 - (chloroacetyl) piperdine, and the like; chlorinated aliphatic acid herbicides such as TCA, dalapon, 2,3-dichloropropionic acid, and the like; chlorinated benzoic acid and phenylacetic acid herbicides such as 2,3,6-TBA, 2,3,5,6-TBA, dicamba, tricamba, amiben, fenac, 2-methoxy-3,6-dichlorophenyl-acetic acid, 3-methoxy - 2,6 - dichlorophenylacetic acid, 2-methoxy - 3,5,6 - trichlorophenylacetic acid, and the like; and such compounds as aminotriazole, maleic hydrazide, phenyl mercuric acetate, endothal, biuret, dimethyl 2,3,5,6 - tetrachloroterephthalate, Diquat, erbon, DNC, DNBP, dichlobenil; DPA, diphenamid, dipropalin, trifluralin, solan, dicryl, merphos, DMPA, and the like. Such herbicides can also be used in the compositions employed in the method of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known including annuals such as pigweed, lambsquarters, foxtail, crabgrass, wild mustard, field pennycress, ryegrass, goose-grass, chickweed, wild oats, velvet leaf, purselane, barnyard grass, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quack-grass Johnson grass, Canada thistle, hedge bindweed, Bermuda grass, sheep sorrel, curly dock, nutgrass, field chickweed, and winter-cress. Similarly, such weeds can be classified as broadleaf or grassy weeds. It is economically desirable to control the growth of such weeds without damaging beneficial plants or livestock.

The method of this invention is particularly valuable for weed control because the active compounds utilized are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The usefulness of the herbicidal method of this invention can be illustrated by many of the established testing techniques known to the art, such as pre- and post-emergence testing. In one pre-emergence test, emulsifiable concentrates or solutions prepared as heretofore described can be extended with water or oil or other suitable extenders, to obtain various concentrations of the active compound. These concentrates are sprayed on the surface of soil which had been seeded less than twenty-four hours earlier with weed seeds. After spraying the soil containers are maintained under normal lighting conditions and supplied with heat as required and daily or more frequent watering. The weeds are observed for about 7 to about 20 days, and the degree of injury to the weeds is recorded. The results indicate that the method of this invention is effective in controlling weeds.

To demonstrate the utility of the method of this invention in post-emergence application, emulsifiable concentrates or solutions of various concentrations of the aforementioned active compounds are sprayed on the foliage of weeds that have attained a prescribed size. After spraying, the weeds are maintained under normal lighting conditions and supplied with heat as required. The soil in which the weeds are growing is watered daily or more frequently. The weeds are observed periodically for up to 14 days or more, and the severity of injury to the weeds is recorded. The results indicate that the method of this invention is effective in controlling weeds.

I claim:

1. A process for controlling undesirable plant life which comprises applying to said plant life in a quantity which is herbicidally toxic a compound of the formula

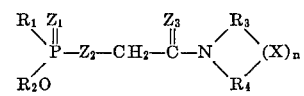

wherein $Z_1$, $Z_2$ and $Z_3$ are independently selected from the group consisting of sulfur and oxygen; $R_1$ is selected from the group consisting of unsubstituted phenyl and substituted phenyl wherein the substituents are selected from the group consisting of alkyl containing 1 to 10 carbon atoms, halogen and mixtures thereof; $R_2$ is selected from the group consisting of alkyl containing 1 to 10 carbon atoms, phenylalkyl containing from 7 to 20 carbon atoms, unsubstituted phenyl and substituted phenyl wherein the substituents are selected from the group consisting of alkyl containing 1 to 10 carbon atoms, halogen and mixtures thereof; $R_3$ and $R_4$ are independently selected from the group consisting of alkyl, acyl, hydroxyalkyl and alkenyl containing 1 to 10 carbon atoms, phenylalkyl containing from 7 to 20 carbon atoms, unsubstituted phenyl, substituted phenyl wherein the substituents are selected from the group consisting of alkyl containing from 1 to 10 carbon atoms, halogen and mixtures thereof, hydrogen provided that a maximum of one of $R_3$ and $R_4$ is hydrogen, and alkylene containing up to 2 carbon atoms; $n$ is an integer from 0 to 1; and X is selected from the group consisting of oxygen, sulfur, $>$NY and $>$CHY wherein Y is selected from the group consisting of lower alkyl and hydrogen, provided that when $n$ is 0, $R_3$ and $R_4$ are selected from the group consisting of alkyl, acyl, aryl, aralkyl, hydroxyalkyl, alkenyl and hydrogen provided that a maximum of one of $R_3$ and $R_4$ is hydrogen and when $n$ is 1, $R_3$ and $R_4$ are alkylene.

2. The process of claim 1 wherein the compound is O-ethyl S-(N,N-diethylcarbamylmethyl) phenylphosphonothiolothionate.

3. The process of claim 1 wherein the compound is O-methyl S-(N-ethyl-N-isopropylcarbamylmethyl) 4-chlorophenylphosphonothiolothionate.

4. The process of claim 1 wherein the compound is O-ethyl S-(N-methyl-N-isopropylcarbamylmethyl) 2-methyl-4-chlorophenylphosphonothiolothionate.

5. The process of claim 1 wherein the compound is

O-ethyl S-(N-phenyl-N-ethylcarbamylmethyl) phenylphosphonothiolothionate.

6. The process of claim 1 wherein the compound is O-methyl S-(N-methyl-N-4-chlorophenylcarbamylmethyl) phenylphosphonothiolothionate.

7. The process of claim 1 wherein the compound is O-isopropyl S-(morpholinocarbonylmethyl) phenylphosphonothiolothionate.

8. The process of claim 1 wherein the compound is O-methyl S-(piperidinocarbonylmethyl) phenylphosphonothiolothionate.

9. The process of claim 1 wherein the compound is O-ethyl S-(N-methyl-N-2,4-dichlorophenylcarbamylmethyl) phenylphosphonothiolothionate.

References Cited

UNITED STATES PATENTS

| | | | |
|---|---|---|---|
| 2,917,533 | 12/1959 | Burger | 71—86 |
| 3,014,949 | 12/1961 | Birum et al. | 71—86 |
| 3,166,565 | 1/1965 | Rigterink | 71—86 |
| 3,350,192 | 10/1967 | Richter | 71—118 |

LEWIS GOTTS, *Primary Examiner.*

G. HOLLRAH, *Assistant Examiner.*

U.S. Cl. X.R.

71—86; 260—247.1, 247.2, 268, 293.4, 294, 943